United States Patent (10) Patent No.: US 7,543,220 B2
Honda et al. (45) Date of Patent: Jun. 2, 2009

(54) CONTROL METHOD FOR ERROR DETECTION & CORRECTION APPARATUS, ERROR DETECTION & CORRECTION APPARATUS, AND COMPUTER-READABLE STORAGE MEDIUM STORING CONTROL PROGRAM FOR ERROR DETECTION & CORRECTION APPARATUS

(75) Inventors: Yasufumi Honda, Kawasaki (JP); Kenji Suzuki, Kawasaki (JP); Takashi Koguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 599 days.

(21) Appl. No.: 11/237,765

(22) Filed: Sep. 29, 2005

(65) Prior Publication Data

US 2006/0236213 A1 Oct. 19, 2006

(30) Foreign Application Priority Data

Mar. 17, 2005 (JP) ............................. 2005-076403

(51) Int. Cl.
*H03M 13/00* (2006.01)
(52) U.S. Cl. ..................... 714/785; 714/755; 702/189; 379/399.02
(58) Field of Classification Search ................. 714/758, 714/785; 702/189; 379/399.02
See application file for complete search history.

(56) References Cited

U.S. PATENT DOCUMENTS 4,736,376 A * 4/1988 Stiffler ........................ 714/785
5,768,294 A * 6/1998 Chen et al. ................... 714/766
2002/0152444 A1* 10/2002 Chen et al. ................... 714/785

FOREIGN PATENT DOCUMENTS

| JP | 57-152599 | 9/1982 |
| JP | 4-023048 | 1/1992 |
| JP | 11-232129 | 8/1999 |

OTHER PUBLICATIONS

NN84046142: 'Fault-Tolerant Memory With Single Error Correcting Codes,' IBM Technical Disclosure Bulletin, vol. No. 26;Issue No. 11;p. No. 6142-6144;Apr. 1, 1984.*

* cited by examiner

*Primary Examiner*—Guy J Lamarre
(74) *Attorney, Agent, or Firm*—Staas & Halsey LLP

(57) ABSTRACT

The present invention provides a control method for an error detection & correction apparatus, comprising a plurality of data processing apparatuses which reside in a data communications path and partake in exchanging data by the unit of error correcting code, and a plurality of information exchange paths which are installed between the plurality of data processing apparatuses; and generating a true syndrome by exchanging a partial syndrome relating to a part of the data partaken by each of the data processing apparatuses by way of the information exchange paths, comprising the step of exchanging renewal information relating to a part of the data partaken by each of the data processing apparatuses with the other data processing apparatus by way of the information exchange path.

17 Claims, 18 Drawing Sheets

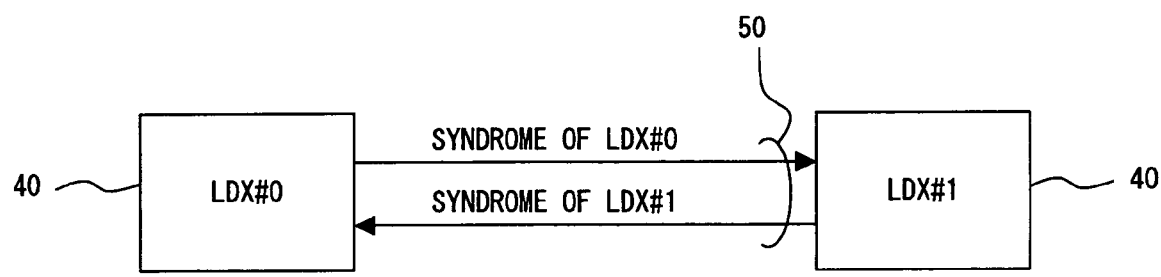
F I G. 6

| SIGNAL NAME | PIN | CONNECTION DIRECTION | DESCRIPTION |
|---|---|---|---|
| LDX_SD_S0[20:0] | 21 | LDX#0 → LDX#1 | DATA SEND BUS 0 (VIEWING FROM LDX #0) |
| LDX_SD_S0_ECC[5:0] | 6 | LDX#0 → LDX#1 | ECC OF DATA SEND BUS 0 |
| LDX_SD_R0[20:0] | 21 | LDX#1 → LDX#0 | DATA RECEIVE BUS 0 (VIEWING FROM LDX #0) |
| LDX_SD_R0_ECC[5:0] | 6 | LDX#1 → LDX#0 | ECC OF DATA RECEIVE BUS 0 |
| LDX_SD_S1[20:0] | 21 | LDX#0 → LDX#1 | DATA SEND BUS 1 (VIEWING FROM LDX #0) |
| LDX_SD_S1_ECC[5:0] | 6 | LDX#0 → LDX#1 | ECC OF DATA SEND BUS 1 |
| LDX_SD_R1[20:0] | 21 | LDX#1 → LDX#0 | DATA RECEIVE BUS 1 (VIEWING FROM LDX #0) |
| LDX_SD_R1_ECC[5:0] | 6 | LDX#1 → LDX#0 | ECC OF DATA RECEIVE BUS 1 |
| TOTAL | 108 | | |

F I G. 7 B

| ID[2:0] | | | PACKET CONTENTS |
|---|---|---|---|
| 0 | 0 | 0 | EMPTY |
| 0 | 0 | 1 | SYNCHRONISM CHECK |
| 0 | 1 | 0 | RESERVE |
| 0 | 1 | 1 | RESERVE |
| 1 | 0 | 0 | SYNDROME EXCHANGE |
| 1 | 0 | 1 | RESERVE |
| 1 | 1 | 0 | RESERVE |
| 1 | 1 | 1 | DATA TRANSMISSION AT A DEGENERATE OPERATION |
| 1 | 0 | 1 | RENEWAL INFORMATION EXCHANGE |

| MEMORY OPERATION | OPERATION MODE | ADDRESSEE/TRANSMITTING LSI | ITEMS | | | | | |
|---|---|---|---|---|---|---|---|---|
| | | | TRANSMISSION DATA CHECK | DELAYED CHECK | SYNDROME BUS CONTENT | ERROR REPORTING LDX | SBE OPERATION (TRANSMISSION/MEMORY) | DBE OPERATION (TRANSMISSION/MEMORY) |
| READ | NORMAL | FLN | × | ○ | SYNDROME | BOTH SIDES | SBE DATA/ CORRECT BY SCRUB WRITE | DBE DATA/ WRITE POISONED DATA |
| | | GDX | | | | | | |
| | DEGENERATE | FLN | ○ | — | DATA (BIDIRECTIONAL) | BOTH SIDES | CORRECTED DATA/ CORRECT BY SCRUB WRITE | POISONED DATA/ WRITE POISONED DATA |
| | | GDX | | | | | | |
| WRITE | NORMAL | FLN | ○ | — | SYNDROME | BOTH SIDES | WRITE CORRECTED DATA | WRITE POISONED DATA |
| | | GDX | | | | | | |
| | DEGENERATE | FLN | ○ | — | DATA (UNIDIRECTIONAL) | ONE SIDE | | |
| | | GDX | | | | | | |
| P-WRITE | NORMAL | FLN | ○ | — | SYNDROME + RENEWAL INFORMATION | BOTH SIDES | WRITE CORRECTED DATA | WRITE POISONED DATA |
| | | GDX | | | | | | |
| | DEGENERATE | FLN | — | — | DATA (UNIDIRECTIONAL) | ONE SIDE | | |
| | | GDX (READ) | | | | | | |
| | | GDX (WRITE) | | | | | | |
| PATROL | NORMAL | | — | — | SYNDROME | BOTH SIDES | CORRECT BY SCRUB WRITE | WRITE POISONED DATA |
| | DEGENERATE | | | | | | | |

SBE: SINGLE BLOCK ERROR
DBE: DOUBLE BLOCK ERROR

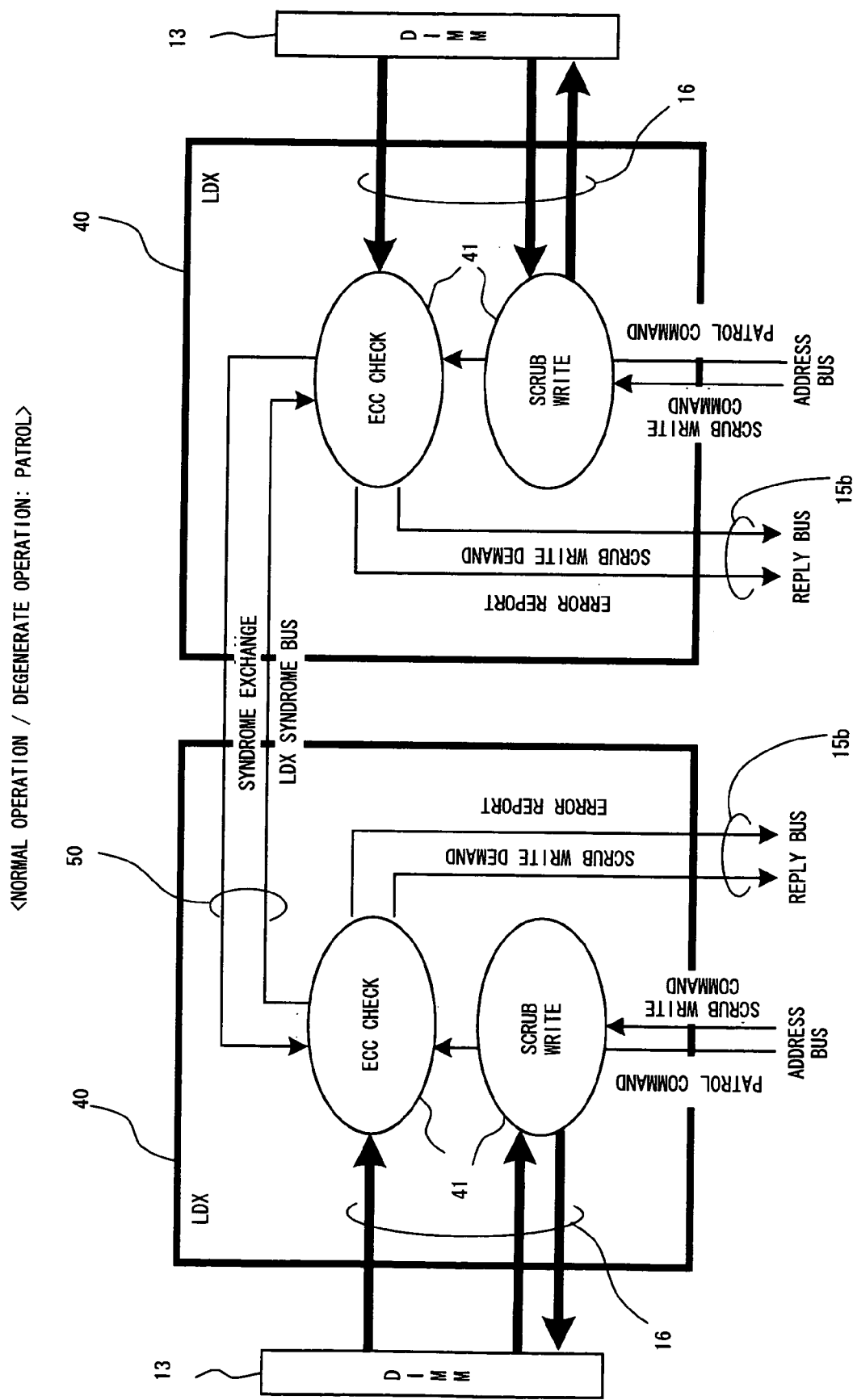
F I G. 17

CONTROL METHOD FOR ERROR DETECTION & CORRECTION APPARATUS, ERROR DETECTION & CORRECTION APPARATUS, AND COMPUTER-READABLE STORAGE MEDIUM STORING CONTROL PROGRAM FOR ERROR DETECTION & CORRECTION APPARATUS

BACKGROUND OF THE INVENTION

1. Field of the Invention

The present invention relates to a control method for error detection & correction apparatus, an error detection & correction apparatus, an information processing system, a control program for error detection & correction apparatus, a data processing apparatus, and in particular a technique effectively applicable to a detection and correction of data error, et cetera, by using an error correcting code (ECC) in a data transmission or accumulation.

2. Description of the Related Art

In an information processing system, known is a method of using an ECC for detecting and correcting a data error which occurs in a bus as information transmission path or memory storing information.

In the case of letting one ECC processing apparatus process a unit of error check ("error check unit" hereinafter unless otherwise noted) in an ECC application, it is necessary to increase the number of pins in the ECC processing apparatus according to a data size of the error check unit, or transmit data by folding itself.

However, an increase of the number of pins in the ECC processing apparatus in proportion to a data size ushers in an increased production cost thereof. And a transmission of folded data causes a one-bit failure in a pin or data transmission path to multiply to a plural-bit failure, hence bringing about a reliability problem of error recovery becoming impossible.

A countermeasure is conceivable to have a plurality of ECC processing apparatuses share the error check unit, in which a method is adopted such that each ECC processing apparatus sharing the processing of the error check unit performs a partial error check and a processing apparatus in upper echelon (e.g., a controller or CPU in upper echelon) achieves a final error check and correction of the error check unit. Alternatively, a method is known to exchange a partial syndrome between a plurality of ECC processing apparatuses sharing an error check unit and generate a true syndrome of the error check unit, as disclosed by the patent documents 1 or 2 listed below.

In specifics, the technique brought forth by the patent document 1 has disclosed an error check & correction circuit comprising means for outputting a partial syndrome to the outside by generating it based on a part of a codeword being inputted from the outside, means for generating a syndrome of a codeword based on the partial syndrome inputted from the outside and partial syndrome generated in the inside, and means for correcting a partial error of a codeword by decoding the generated syndrome.

And the patent document 2 has disclosed a technique to enable a plurality of ECC circuits with the exact same configuration to share-process a multi-bit data by making the ECC circuits sharing each of a plurality of blocks adaptable to either of an upper bit block or lower bit block by an external control signal only, in the case of generating an ECC for each of a plurality of blocks which are obtained by dividing a multi-bit data into plural parts.

If a processing apparatus in a higher echelon is to perform a data processing, however, each ECC processing apparatus sharing the error check unit will no longer be able to handle a high level data processing (e.g., a data processing only possible following an error check such as a partial merge of data). Likewise, there has been a problem of a simple partial syndrome exchange being unable to make it possible to perform a high level data processing as noted above.

[Patent document 1] Japanese patent laid-open application publication No. 4-023048

[Patent document 2] Japanese patent laid-open application publication No. 11-232129

SUMMARY OF THE INVENTION

A purpose of the present invention is to enable each processing apparatus to perform a high level data processing such as requiring a merge processing of data in an error detection & correction technique for processing data by the unit of ECC error check in a plurality of partaking processing apparatuses.

Another purpose of the present invention is to enable each processing apparatus to perform a diverse error detection & correction processing corresponding to a category of detected error, et cetera, in an error detection & correction technique for processing data by the unit of ECC error check in a plurality of partaking processing apparatuses.

Yet another purpose of the present invention is to accomplish an error detection & correction capability equivalent to the case in which one data processing apparatus processes data by the unit of ECC error check.

A first aspect of the present invention is to provide a control method for an error detection & correction apparatus, comprising a plurality of data processing apparatuses which reside in a data communication path and partake in exchanging data by the unit of error correcting code, and a plurality of information exchange paths which are installed between the plurality of data processing apparatuses; and generating a true syndrome by exchanging a partial syndrome relating to a part of the data partaken by each of the data processing apparatuses by way of the information exchange paths, comprising the step of exchanging renewal information relating to a part of the data partaken by each of the data processing apparatuses with the other data processing apparatus by way of the information exchange path.

A second aspect of the present invention is to provide an error detection & correction apparatus, comprising a plurality of data processing apparatuses which reside in a data communication path and partake in exchanging data by the unit of error correcting code and a plurality of information exchange paths which are installed between the plurality of data processing apparatuses; and generating a true syndrome by exchanging a partial syndrome relating to a part of the data partaken by each of the data processing apparatuses by way of the information exchange paths, comprising: an information exchange unit for exchanging renewal information relating to a part of the data partaken by each of the data processing apparatuses with the other data processing apparatus by way of the information exchange path.

A third aspect of the present invention is to provide an information processing system, including a storage apparatus, an access apparatus for accessing the storage apparatus, a data transmission path for connecting the storage apparatus with the access apparatus and an error detection & correction apparatus residing in the data transmission path, wherein the error detection & correction apparatus comprises a plurality of data processing apparatuses partaking in exchanging data by the unit of error correcting code in data transmission paths, information exchange paths installed between a plurality of the data processing apparatuses, and an information exchange unit for exchanging a partial syndrome relating to a part of the data partaken by each of the data processing apparatuses and renewal information relating to a part of the data partaken by each of the data processing apparatus with a plurality of the data processing apparatuses by way of the information exchange paths.

A fourth aspect of the present invention is to provide a signal for carrying control program, for an error detection & correction apparatus comprising a plurality of data processing apparatuses which reside in a data communication path and partake in exchanging data by the unit of error correcting code, and a plurality of information exchange paths which are installed between the plurality of data processing apparatuses, wherein the signal for carrying control program makes each of the data processing apparatuses carry out the process of exchanging a partial syndrome relating to a part of the data partaken by each of the data processing apparatuses and renewal information relating to a part of the data partaken by each of the data processing apparatus with a plurality of the data processing apparatuses by way of the information exchange paths.

A fifth aspect of the present invention is to provide a data processing apparatus, being included in an error detection & correction apparatus residing in a data communication path and partaking in exchanging data by the unit of error correcting code, comprising an information exchange unit for exchanging a partial syndrome relating to a part of the data partaken by the own apparatus and renewal information relating to a part of the data partaken by own apparatus with other data processing apparatus.

According to the above described present invention, each of data processing apparatuses is enabled for a high level data processing such as a partial data merge by exchanging error correction information between a plurality of data processing apparatuses instead of being limited by a partial syndrome, in an error detection & correction technique for processing data by the unit of ECC error check ("ECC error check unit" hereinafter unless otherwise noted) in a plurality of partaking processing apparatuses.

For instance, a high level data processing, such as a read modify write (i.e., a partial data merge), is enabled even if data by the ECC error check unit is processed across a plurality of data processing apparatuses, each of which is configured to deal with data protected by the ECC, such as a memory controller.

Also, a diverse error detection and correction processing in response to a detected error are enabled by exchanging error correction information other than partial syndromes between a plurality of data processing apparatuses. Furthermore, an error detection & correction capability equivalent to the case of a single data processing apparatus dealing with data by an error check unit can be achieved.

BRIEF DESCRIPTION OF THE DRAWINGS

FIG. 6 is a conceptual diagram showing an operation of a plurality of data processing apparatuses constituting a memory access control apparatus according to an embodiment of the present invention;

FIG. 7B describes an example of signal specification for an information exchange bus between a plurality of data processing apparatuses constituting a memory access control apparatus according to an embodiment of the present invention;

FIG. 8 describes an example setup of identifier information about information packet exchanged between a plurality of data processing apparatuses constituting a memory access control apparatus according to an embodiment of the present invention;

FIG. 13 describes a list of error check control by a plurality of data processing apparatuses constituting a memory access control apparatus according to an embodiment of the present invention;

FIG. 17 is a conceptual diagram showing an example of patrol operation by a plurality of data processing apparatuses constituting a memory access control apparatus according to an embodiment of the present invention.

DESCRIPTION OF THE PREFERRED EMBODIMENTS

The following is a detailed description of the preferred embodiment of the present invention while referring to the accompanying drawings.

Figure 1:
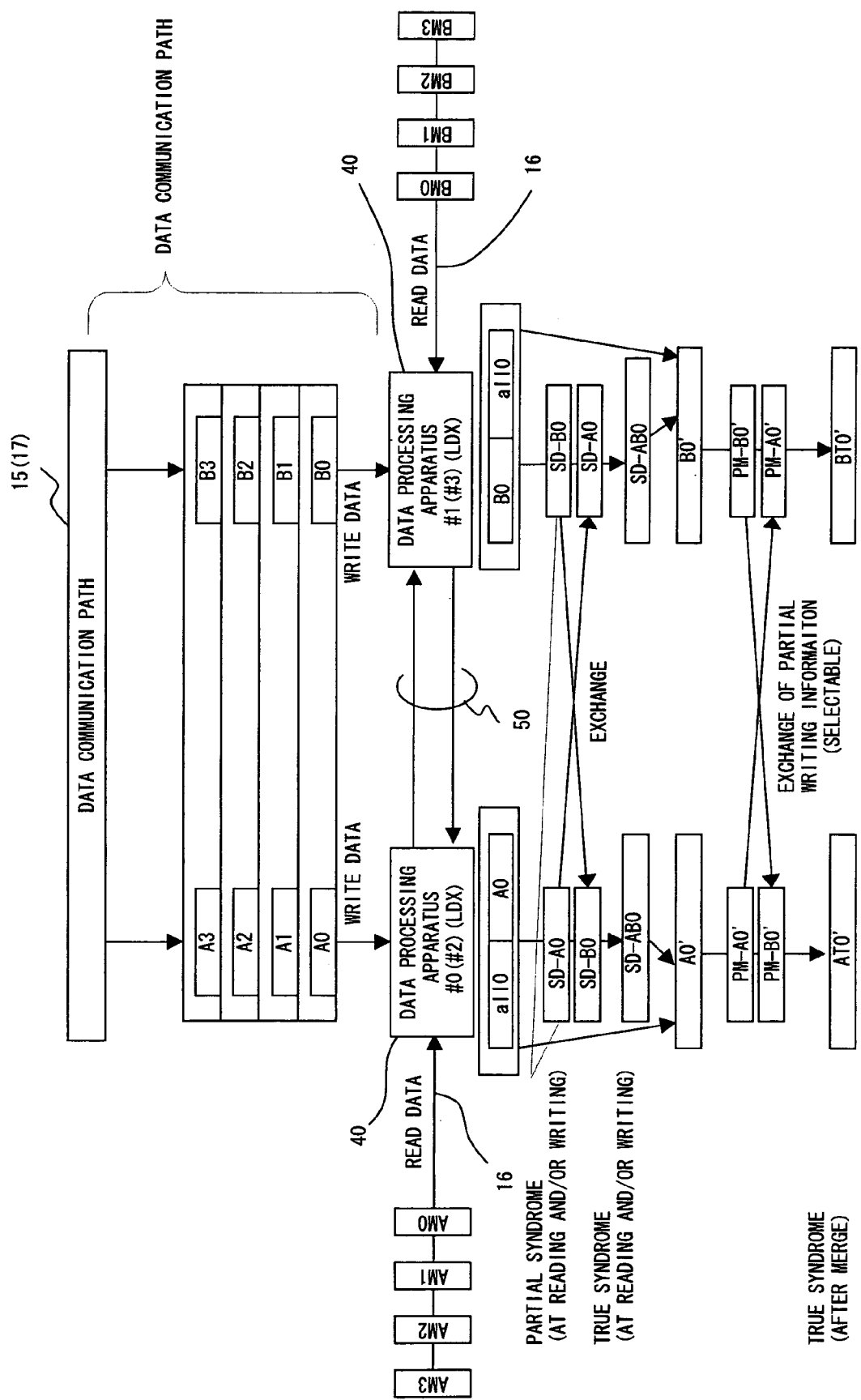
FIG. 1 is a conceptual diagram showing an example operation of error detection & correction apparatus according to an embodiment of the present invention.
Figure 2:
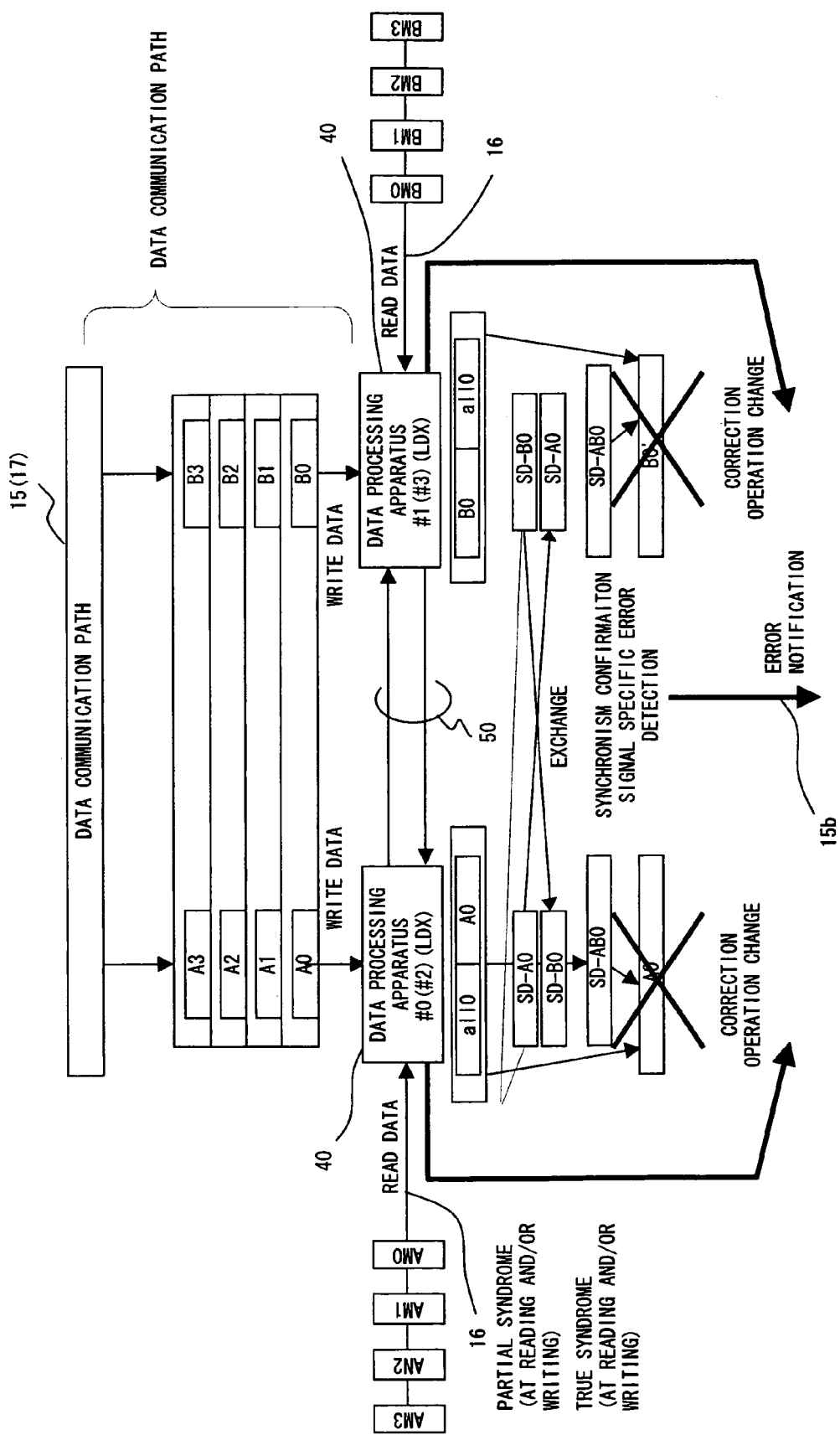
FIG. 2 is a conceptual diagram showing a modified operation of error detection & correction apparatus according to an embodiment of the present invention.

FIG. 1 is a conceptual diagram showing an example operation of error detection & correction apparatus according to an embodiment of the present invention; and FIG. 2 is a conceptual diagram showing a modified operation of error detection & correction apparatus according to an embodiment of the present invention.

Figure 3:
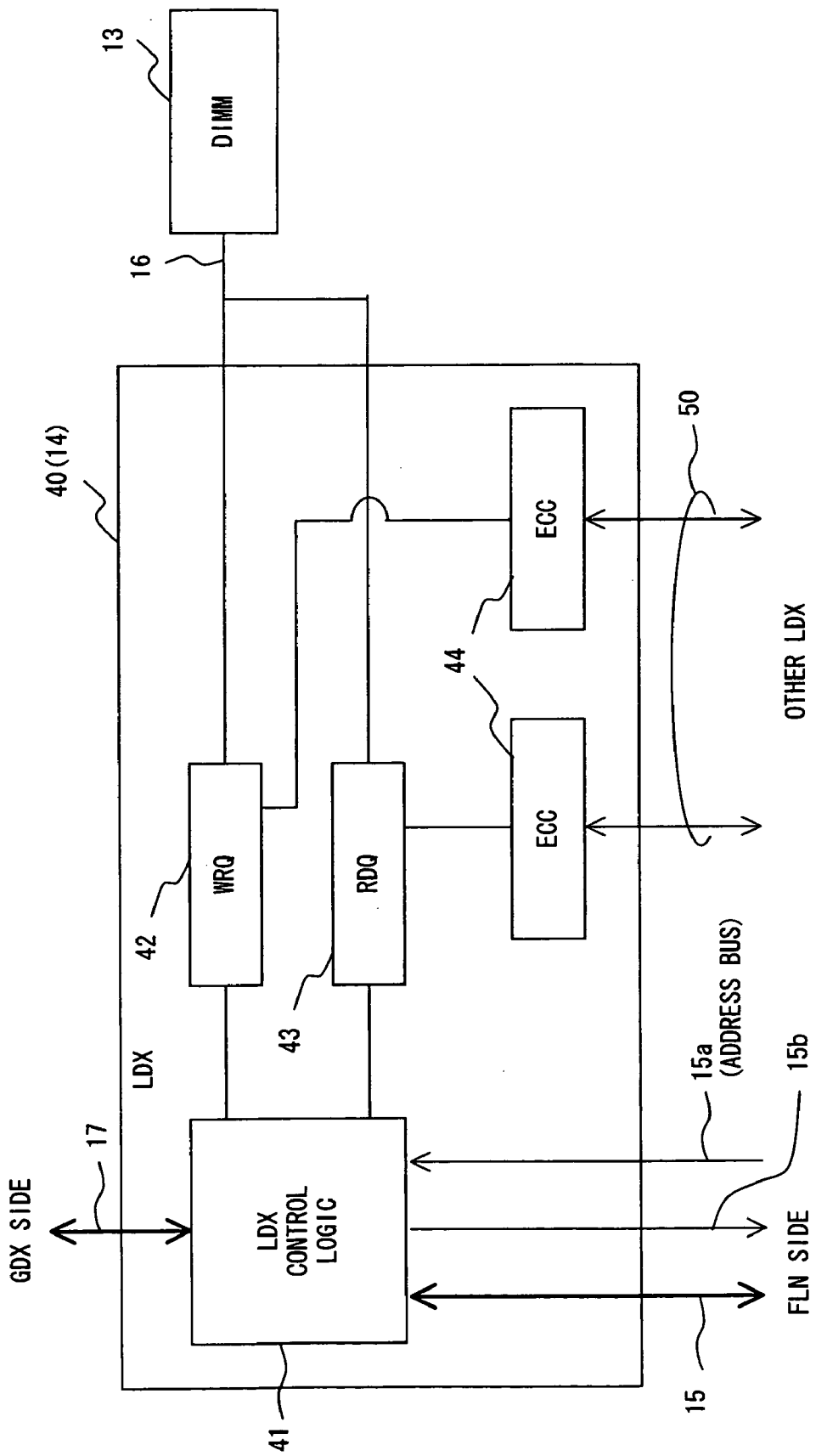
FIG. 3 is a block diagram showing an example comprisal of data processing apparatus constituting a memory access control apparatus as an example of error detection & correction apparatus according to an embodiment of the present invention.
Figure 4:
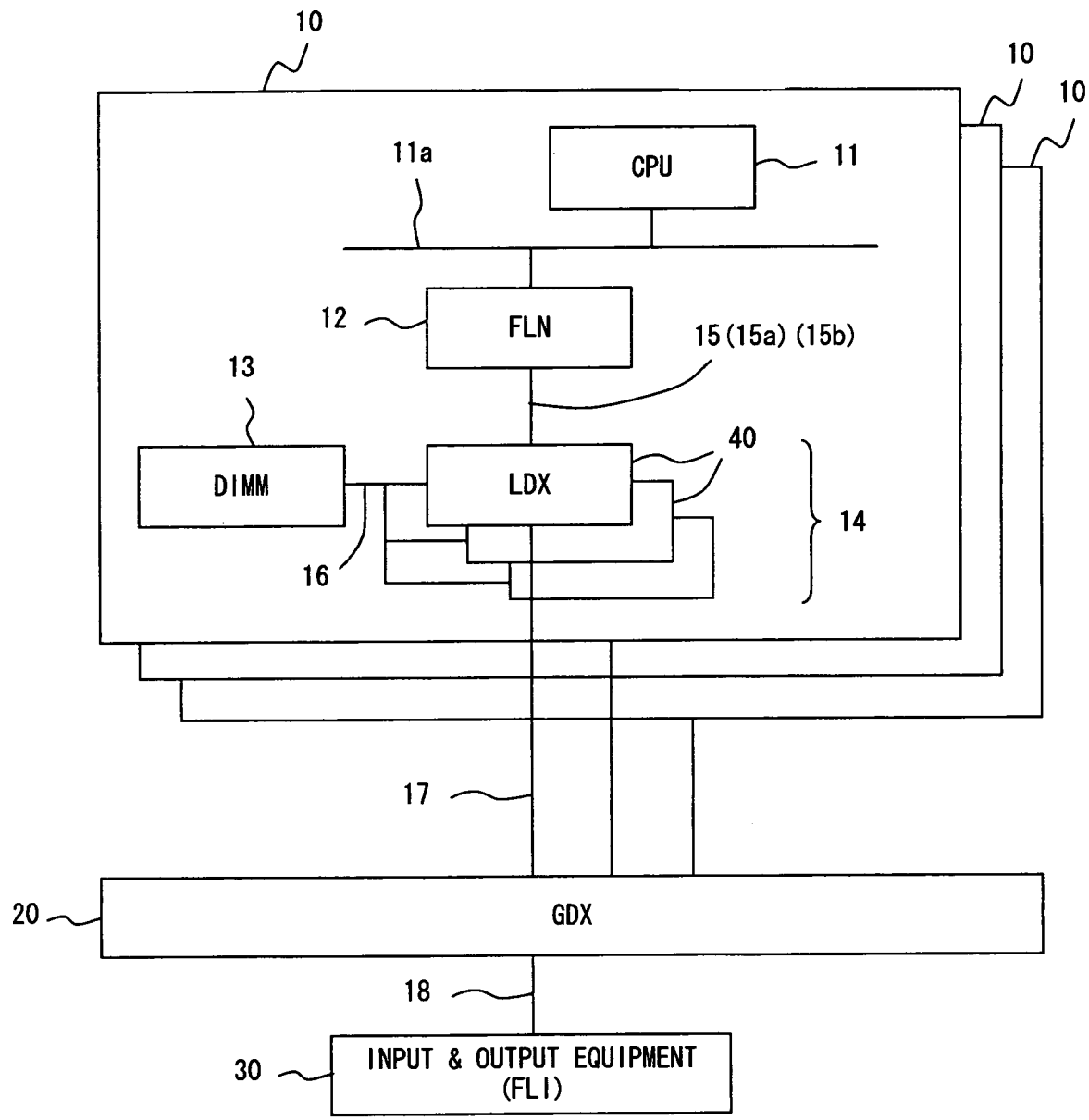
FIG. 4 is a conceptual diagram showing an example comprisal of information processing system according to an embodiment of the present invention.

FIG. 3 is a block diagram showing an example comprisal of data processing apparatus constituting a memory access control apparatus as an example of error detection & correction apparatus according to an embodiment of the present invention; and FIG. 4 is a conceptual diagram showing an example comprisal of information processing system according to an embodiment of the present invention.

First description is about a comprisal of information processing system according to the present embodiment while referring to FIG. 4. The information processing system according to the present embodiment comprises a plurality of information processing apparatuses 10, a bus switch 20 (i.e., GDX) and one or a plurality of input & output equipments 30 (i.e., FLI).

The bus switch 20 switches connections of information transmission paths between these information processing apparatuses 10 and input & output equipment 30.

The each of information processing apparatuses 10 includes a CPU 11, a system bus 11a, an input & output control apparatus 12 (i.e., FLN), a memory apparatus 13 (i.e., DIMM), a memory access control apparatus 14 (i.e., error detection & correction apparatus) (LDX), an upper side bus 15, a memory bus 16 and a lower side bus 17.

The CPU 11 executes an information processing by accessing to a program and data stored in the memory apparatus 13.

The input & output control apparatus 12 controls information exchanges between the CPU 11 and the memory apparatus 13, other information processing apparatuses 10 and input & output equipment 30.

The memory apparatus 13 stores a program and data executed by the CPU 11. The memory access control apparatus 14 functions as an error detection & correction apparatus in the case of the present embodiment. That is, the memory access control apparatus 14 performs an error detection & correction by using an ECC for data read/written, out of/in, the memory apparatus 13 by way of the memory bus 16, upper side bus 15 and lower side bus 17.

In other words, the data transferred through the upper side bus 15, memory bus 16 and lower side bus 17 is protected by the ECC as described later.

Each of the memory access control apparatus 14 is constituted by a plurality of data processing apparatuses 40 (LDX), each of which comprises as exemplified by FIG. 3.

Specifically, each data processing apparatus 40 comprises a memory access control logic 41, a write buffer 42 (WRQ), a read buffer 43 (RDQ) and an information exchange buffer 44 (ECC). A plurality of the data processing apparatuses 40 are interconnected by an information exchange bus 50 (i.e., information exchange path).

The write buffer 42 temporarily stores write data to be written in the memory apparatus 13 from the CPU 11, other information processing apparatus 10, input & output equipment 30, et cetera.

The read buffer 43 temporarily stores read data which is read out of the memory apparatus 13.

The memory access control logic 41 comprises a control logic (i.e., control program) in the form of software, firmware or hardware for accomplishing the functions as described below.

Specifically, the memory access control logic 41 comprises the function of performing an ECC processing for a read or write data in a data width of the upper side bus 15 and lower side bus 17 by sharing with other partaking data processing apparatus 40 by exchanging a series of information therewith by way of the information exchange bus 50.

The memory access control logic 41 comprises the function of enabling a conversion and error check & correction of a check bit also at the time of partially renewing data by the ECC error check unit for the upper side bus 15, memory bus 16 and lower side bus 17.

The memory access control logic 41 comprises the function of selecting an operation for using, or not using, the information exchange bus 50 for data by the unit of ECC error check in response to a pattern of partial renewal information.

The memory access control logic 41 comprises the function of altering a check bit (i.e., renewing) which regards all the data partaken by the other data processing apparatuses 40 as zero (0) for the data after being partially renewed, not for the partial renewal information at the time of error correction, and of exchanging with the other data processing apparatus 40 by way of the information exchange bus 50.

The memory access control logic 41 comprises the function of exchanging detected information of a specific error pattern which has been detected within its own apparatus with the other data processing apparatus 40 by way of the information exchange bus 50, and changing an error correction operation.

The memory access control logic 41 comprises the function of preventing an erroneous correction due to a use of a wrong partial syndrome through the steps of adding a synchronism confirmation signal to a partial syndrome, and an ECC protection to the information exchange bus 50 per se as well; exchanging with the other data processing apparatus 40 by way of the aforementioned information exchange bus 50; and detecting an erroneous usage timing of the partial syndrome in own apparatus and the other data processing apparatuses 40.

The memory access control logic 41 comprises the function of controlling a data length variably of a partial syndrome being exchanged with other data processing apparatus 40 by way of the information exchange bus 50.

The memory access control logic 41 comprises the function of not only sending corrected data by exchanging a partial syndrome by way of the information exchange bus 50 out to the input & output control apparatus 12, et cetera, but also sending out pre-correction data in advance followed by notifying of a detected error afterwards.

Let it exemplify a further specific about the data processing apparatus 40 for constituting the memory access control apparatus 14, with the first description about exchanging a partial syndrome between a plurality of data processing apparatuses 40 (LDX) by way of the information exchange bus 50.

An example practice is to divide a 128-byte data into four of LDX/DIMM and make the best use of the upper side bus 15 and/or lower side bus 17 between FLN-LDX and/or FLN-GDX in order to minimize a transmission latency of a 128- byte cache line in the CPU 11. Consequently, as a 16-byte ECC straddles two LDXes, do not basically perform an error check and instead let the LDX transmit the data, S4EC-D4ED (Single 4-bit block Error Correction/Double 4-bit block Error Detection)-code, as is, to the devices such as FLN and FLI.

Figure 5:
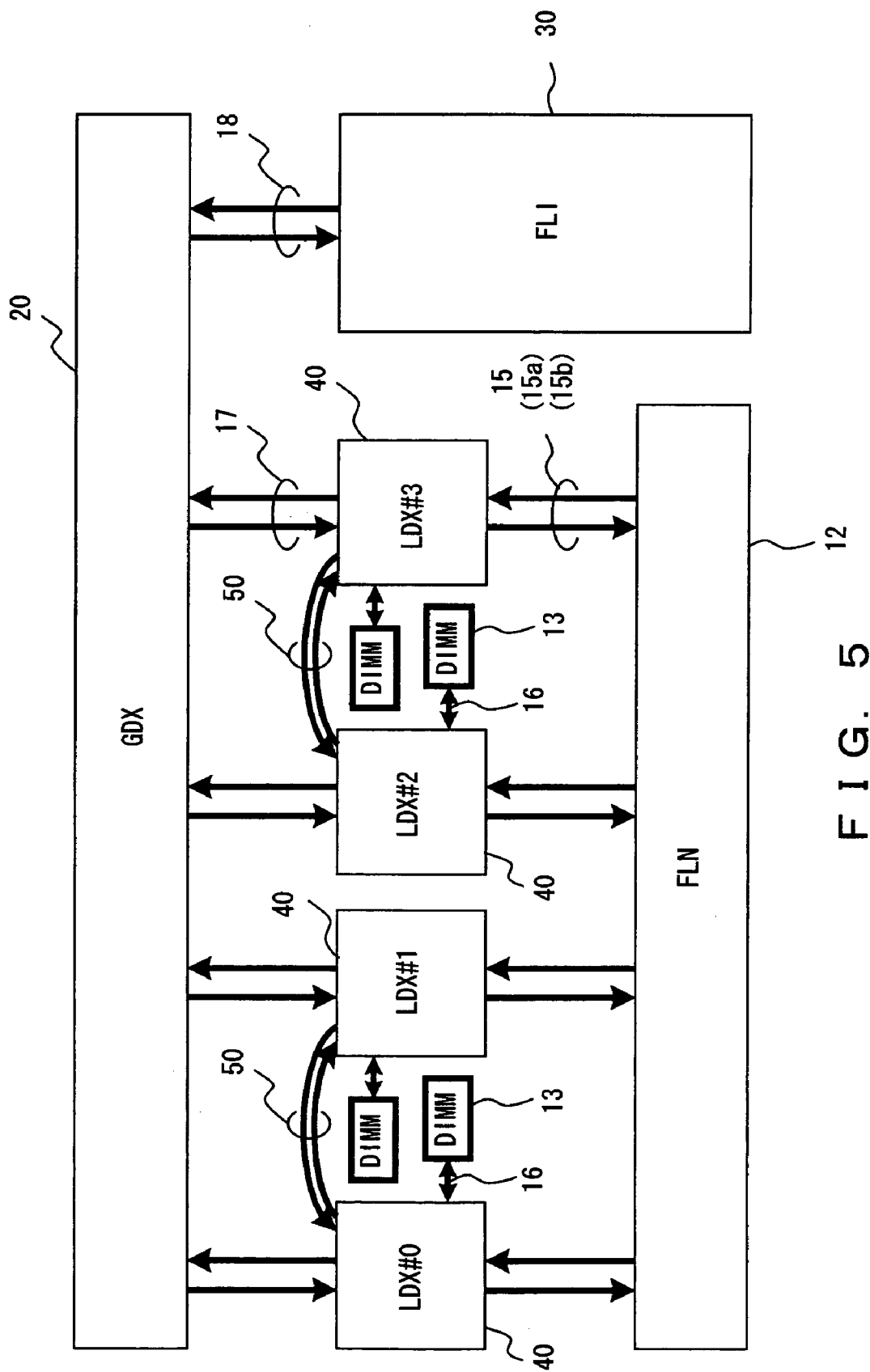
FIG. 5 is a conceptual diagram showing more specifically an example comprisal of information processing system according to an embodiment of the present invention.

FIG. 5 shows a bus as a subject of protection by an ECC (16-byte S4EC-D4ED) by a 32 SMP (symmetrical multi processor) basic comprisal.

Basically, the FLN (i.e., input & output control apparatus 12)/FLI (i.e., input & output equipment 30) perform a generation and check & correction of an ECC, while the LDX also performs the check & correction in order to complete an identification of error spot, a later described patrol in the DIMM (i.e., memory apparatus 13) and a data moving at the time of partial write such as a read modify write, all within the LDX. This necessitates the information exchange bus 50 to be equipped between the adjacent LDXes as a bus for exchanging a syndrome. As described later, the information exchange bus 50 comprises two kinds of buses, i.e., bus #0 and bus #1, whose data transmission directions are mutually the opposite.

The next description is about an error control by the memory access control logic 41 performed by each of the data processing apparatuses 40 (i.e., LDX) constituting the memory access control apparatus 14.

The memory access control apparatus 14 comprising a plurality of LDXes performs the operations of a memory read, memory write, partial write (i.e., read modify write) and patrol (i.e., periodical operation monitor processing), all for accessing to the memory apparatus 13.

The following shows an error control by the LDX at the time of the above described respective operations. The summary is as follows:

(1) The LDX too performs an ECC check for identifying an error spot. This necessitates the LDXes straddled by an ECC check unit to exchange a syndrome; and (2) The ECC check at the time of a read is a delayed check due to putting an emphasis on a memory latency. That is, a transmission of data which is read out of the memory apparatus 13 to the FLN/FLI followed by executing an ECC check and then reporting an error to the FLN/FLI later if the error is detected.

In an ECC check accompanying an exchange of partial syndrome, an exchange of syndrome is performed by using the information exchange bus 50 which will also be used for a data transmission path at the time of a degenerate operation. A transmission protocol for the information exchange bus 50 will be described later.

As shown by FIG. 6, the plurality of data processing apparatuses 40 (i.e., LDXes #0/#1) partaking in a data width of the ECC error check unit (e.g., 16 bytes) transmit a partial syndrome detected within own apparatus to the other partaking apparatus by way of the information exchange bus 50. That is, to generate a syndrome to send out to the other apparatus by setting zero (0) as the value for the other 8 bytes of data partaken by the other LDX. If there is no error in the data, the values of mutually sent syndromes are the same.

If an error is detected in the ECC check by the LDXes, the memory access control logic 41 comprised by the LDX reports the error to an FLN in an upper echelon through a reply bus 15b.

An error is classified into three types (i.e., SBE: single block error (correctable), DBE: double block error (uncorrectable) and detection of poisoned data) for each of the four memory operations (i.e., memory read, memory write, partial write and patrol) in the error report.

Usually, the members of a team of LDXes (LDXes #0 and #1, or LDXes #2 and #3, in the example shown by FIG. 5) straddled by an ECC check unit report the same content, except for a memory write at a degenerate operation, et cetera, in which only one LDX in a team may report.

Since an error reporting is performed by a team of LDXes straddled by an ECC check unit, or a single LDX, the processing is done in a cycle unaffecting a synchronous operation of all the LDXes. That is, a higher priority is always placed on a notification of memory write complete which also uses the reply path. The same goes with a later described scrub write demand during which an error report about the ECC check will not be done.

Figure 7A:
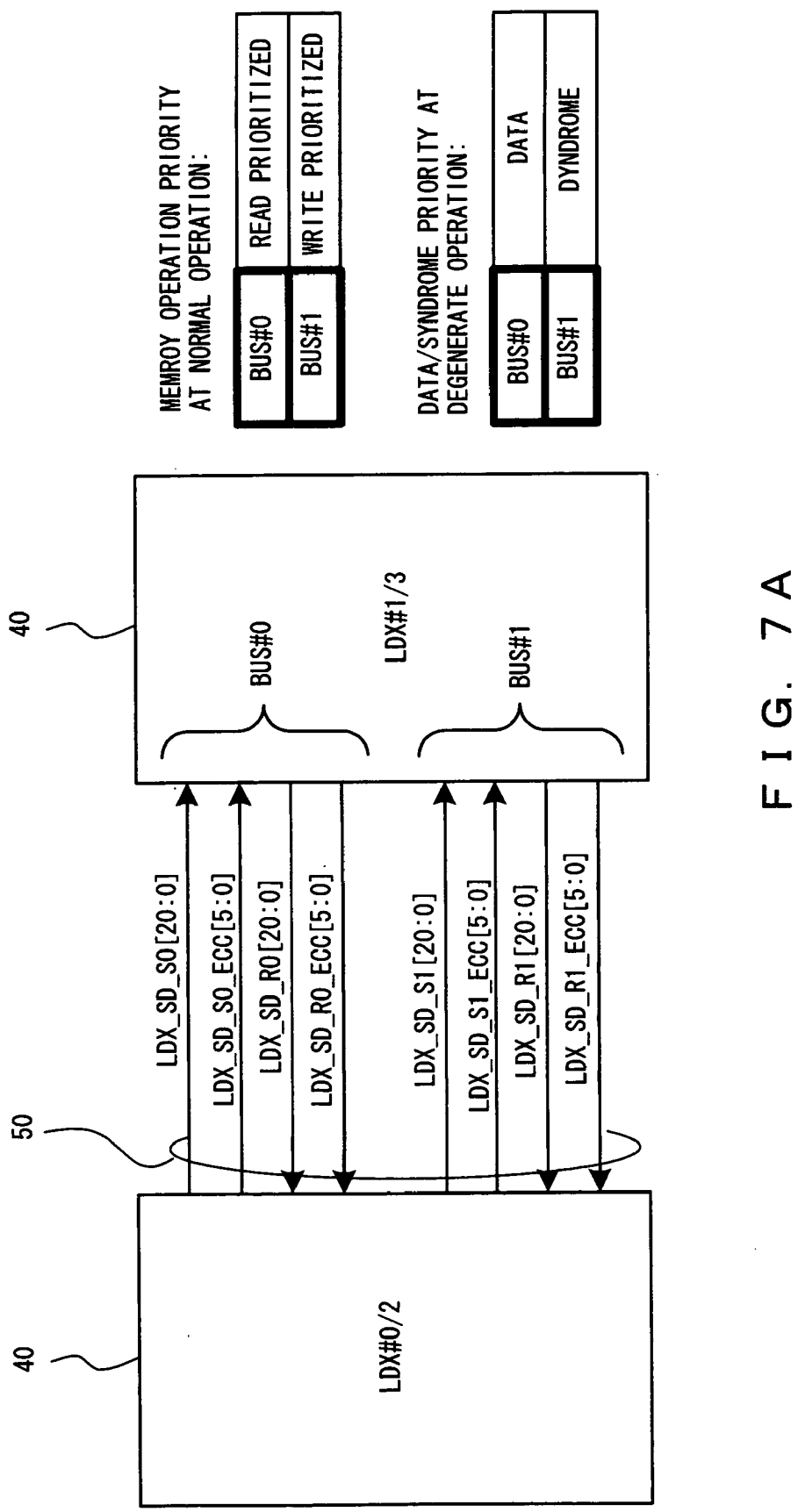
FIG. 7A is a conceptual diagram showing an example comprisal of information exchange bus between a plurality of data processing apparatuses constituting a memory access control apparatus according to an embodiment of the present invention.

FIG. 7A is a conceptual diagram showing an example comprisal of the information exchange bus 50 according to the present embodiment. The information exchange bus 50 comprises the bus #0 and bus #1, with each thereof comprising respective signals by the bit widths (i.e., the numbers of pins) as exemplified by FIG. 7B.

As described above, the transmitted data is protected by the 21-bit data ECC (i.e., SEC-DED) in either the bus #0 or bus #1 constituting the information exchange bus 50.

And the following is performed by using the information exchange bus 50 according to the present embodiment:

(1) DIMM read, patrol and write; syndrome exchange for 16-byte ECC check at partial write; and exchanging renewal information;

(2) synchronism check between LDX #0 and #1, and between LDX #2 and #3; and (3) data transmission at degenerate operation.

FIG. 8 describes an example setup of identifier information about information packet exchanged between LDXes by way of the information exchange bus 50. FIGS. 9, 10, 11 and 12 are conceptual diagrams exemplifying respective formats of various packets.

Figure 9:
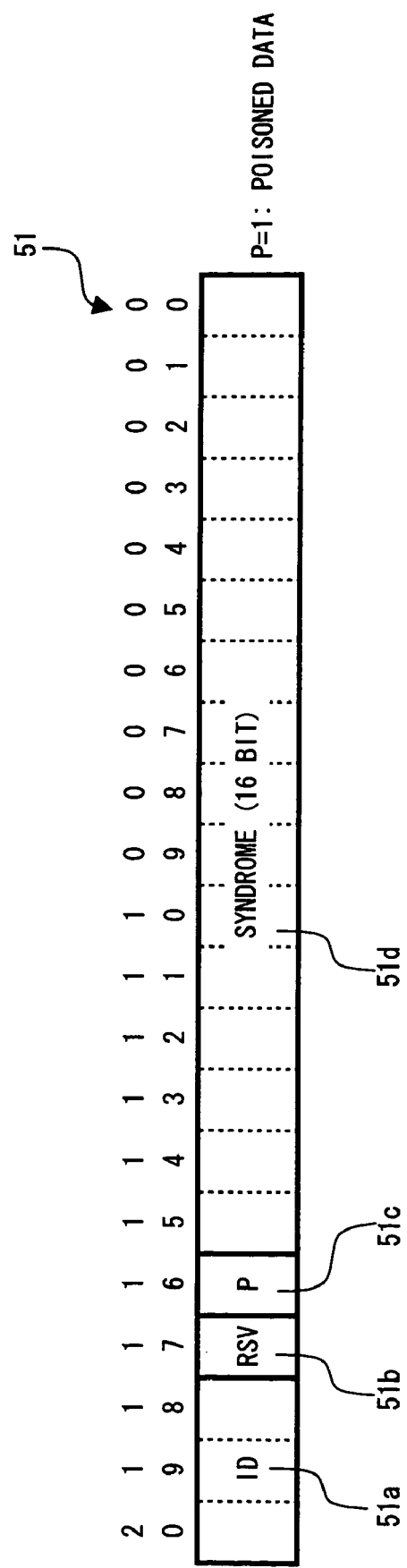
FIG. 9 is a conceptual diagram showing an example format for a syndrome exchange packet exchanged between a plurality of data processing apparatuses constituting a memory access control apparatus according to an embodiment of the present invention.

FIG. 9 shows an example configuration of syndrome exchange packet 51 for exchanging a syndrome. The syndrome exchange packet 51 comprises an ID part 51a, a reserve part 51b, error identifier information 51c and a syndrome value 51d. The ID part 51a is set with "100" corresponding to a "syndrome exchange" shown by FIG. 8. The error identifier information 51c is set with an information bit for identifying a poisoned data or otherwise.

Incidentally a configuration may be such that, if the error identifier information 51c is set, the syndrome value 51d stores information for indicating an error category instead of a syndrome value so as to exchange between the corresponding LDXes and switch the error correction operation in the respective LDXes.

Figure 10:
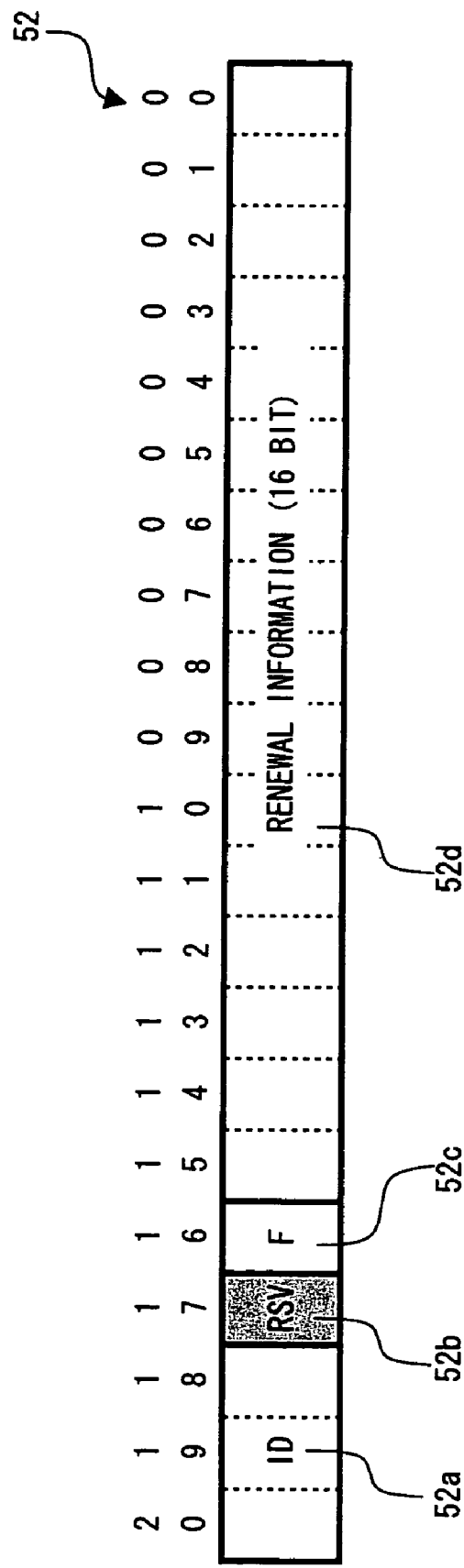
FIG. 10 is a conceptual diagram showing an example format for a renewal information exchange packet exchanged between a plurality of data processing apparatuses constituting a memory access control apparatus according to an embodiment of the present invention.

FIG. 10 shows an example configuration of renewal information exchange packet 52 for exchanging renewal information. The renewal information exchange packet 52 comprises an ID part 52a, a reserve part 52b, an operation change flag 52c and renewal information 52d. The ID part 52a is set with "101" corresponding to a "renewal information exchange" shown by FIG. 8. The renewal information 52d stores a post-correction data obtained by the LDX which has transmitted the aforementioned renewal information exchange packet 52. The operation change flag 52c is used for changing an operation if a specific error pattern is detected as a result of the LDXes notifying each other of detecting the aforementioned specific error pattern.

Figure 11:
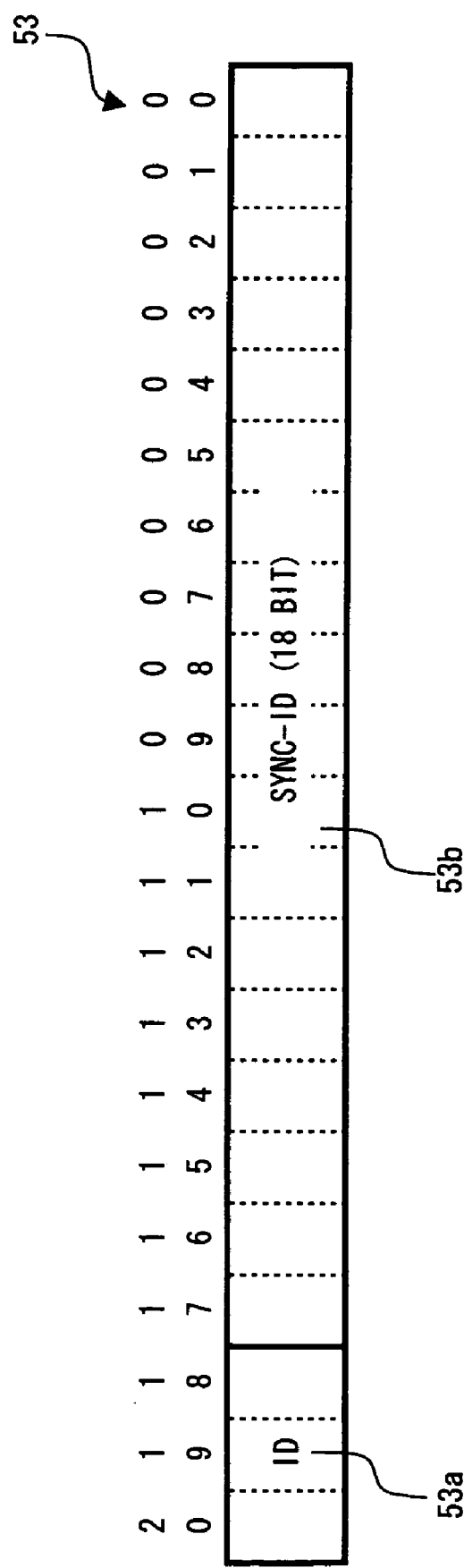
FIG. 11 is a conceptual diagram showing an example format for a synchronism check packet exchanged between a plurality of data processing apparatuses constituting a memory access control apparatus according to an embodiment of the present invention.

FIG. 11 shows an example configuration of synchronism check packet 53 for a synchronism check. The synchronism check packet 53 comprises an ID part 53a and synchronism identifier information 53b.

The ID part 53a is set with "001" corresponding to a "synchronism check" shown by FIG. 8. The synchronism identifier information 53b is set with a Sync-ID for controlling a synchronism between the LDXes.

A synchronism check is for controlling a synchronism between the LDXes #0 and #1, and between the LDXes #2 and #3, mutually partaking in the ECC data unit, not checking the synchronism among all the LDXes.

Figure 12:
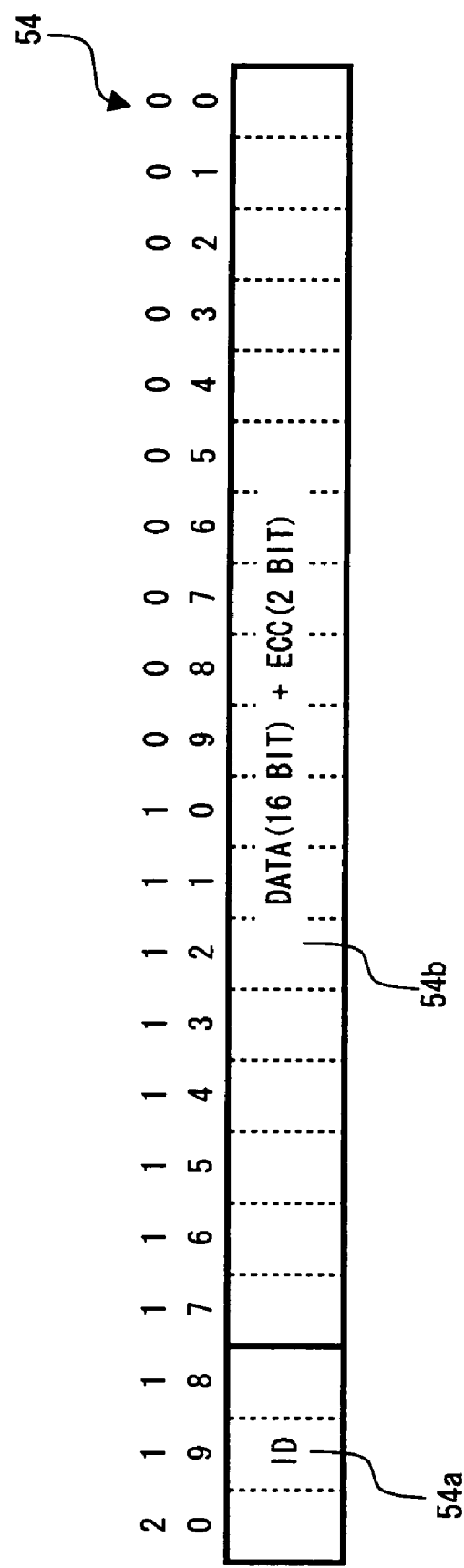
FIG. 12 is a conceptual diagram showing an example format for an at-degenerate operation data packet exchanged between a plurality of data processing apparatuses constituting a memory access control apparatus according to an embodiment of the present invention.

FIG. 12 shows an example configuration of data packet 54 at the time of a degenerate operation ("at-degenerate operation data packet 54" hereinafter) The at-degenerate operation data packet 54 comprises an ID part 54a and transmission data 54b. The ID part 54a is set with "111" corresponding to a "degenerate operation data transmission" shown by FIG. 8. The transmission data 54b stores transmission data at a degenerate operation.

FIG. 13 describes a list of error check control by each LDX, showing the error check operation in the operations of a read, write, p-write (i.e., partial write) and patrol.

The following is a description about an example operation of the information processing apparatus 10, memory access control apparatus 14 and information processing system according to the present embodiment while referring to FIGS. 1 and 2; and FIGS. 14, 15, 16 and 17.

Figure 14:
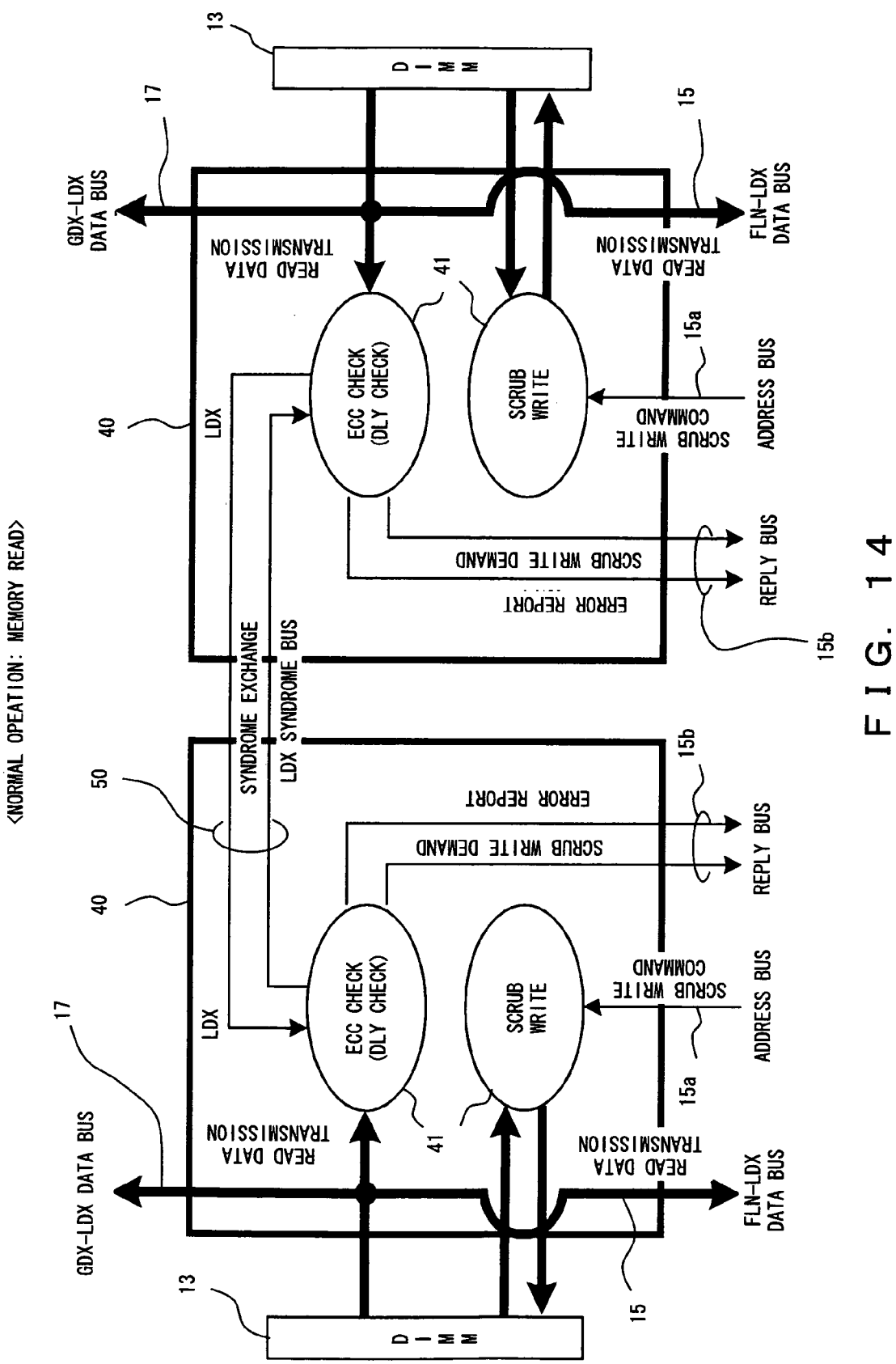
FIG. 14 is a conceptual diagram showing an example of memory read operation by a plurality of data processing apparatuses constituting a memory access control apparatus according to an embodiment of the present invention.

FIG. 14 shows a read operation by the memory apparatus 13 (i.e., DIMM) at the normal operation. In each LDX, the memory access control logic 41 participate in executing an ECC check for readout data by transmitting the read data out of the memory apparatus 13 to the input & output control apparatus 12 and exchanging the partial syndrome values by way of the information exchange bus 50. In this event, the transmission of the data to the input & output control apparatus 12 is put in a higher priority and an error will be reported thereto later by using the reply bus 15b if the error is detected in the readout data. A data read from the memory apparatus 13 to the input & output equipment 30 will likewise be done.

Meanwhile, if an error is detected by an ECC check for a read data out of the memory apparatus 13, the memory access control logic 41 performs a Scrub Write demand to the input & output control apparatus 12 by way of the reply bus 15b and executes a Scrub Write, which repairs stored data within the memory apparatus 13, for a storage zone of an address instructed by the input & output control apparatus 12 by way of the address bus 15a.

Figure 15:
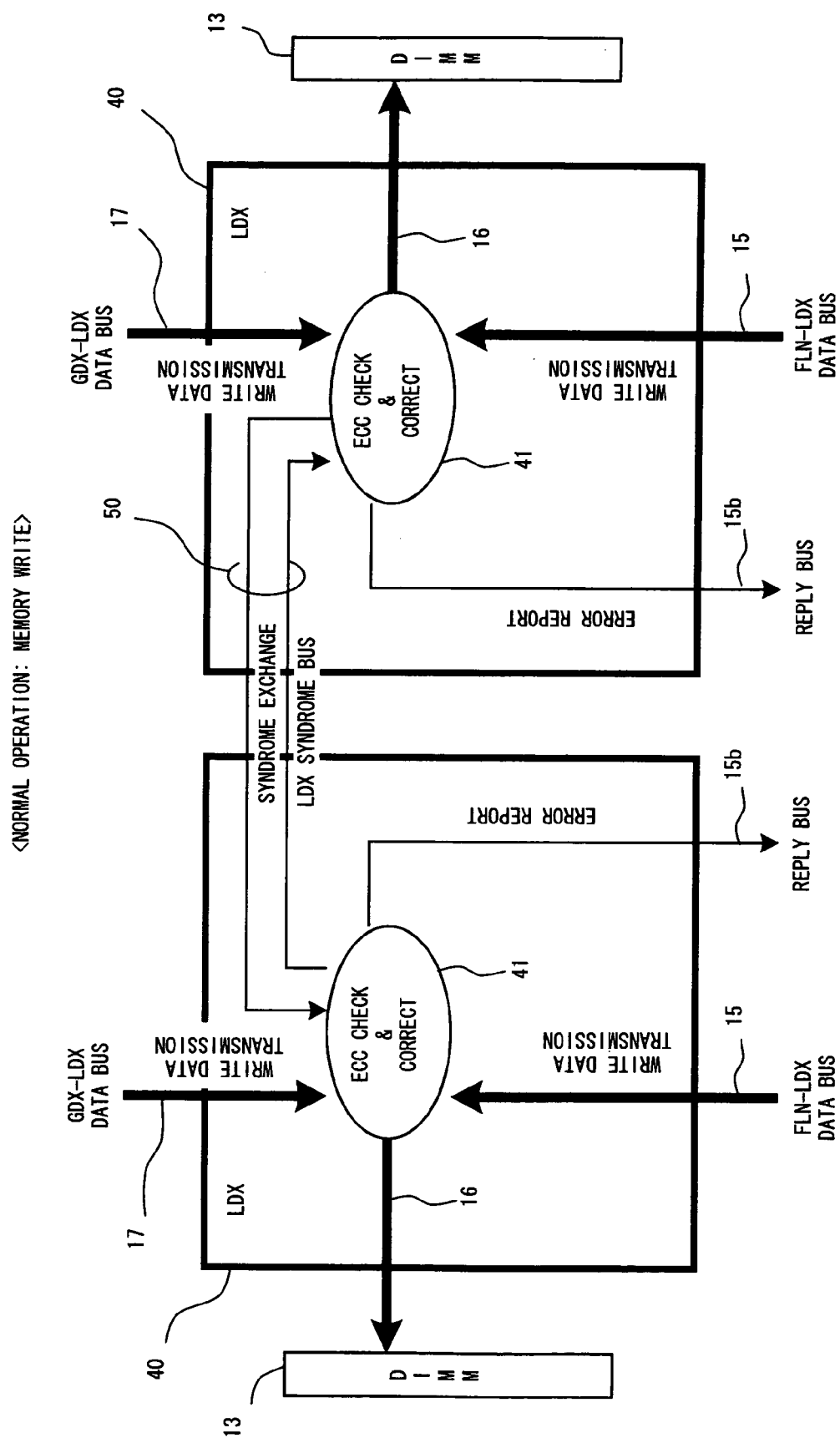
FIG. 15 is a conceptual diagram showing an example of memory write operation by a plurality of data processing apparatuses constituting a memory access control apparatus according to an embodiment of the present invention.

FIG. 15 shows an operation of the LDX in a write operation for the memory apparatus 13.

A plurality of LDXes partake in executing an ECC check and correction for the write data coming in from the input & output control apparatus 12 by way of the upper side bus 15, and, if an error is detected, the memory access control logic 41 comprised in the inside of each LDX corrects the error to write in the memory apparatus 13 and also reports the error to the input & output control apparatus 12 by way of the reply bus 15b. A data write processing for the data from the input & output equipment 30 to the memory apparatus 13 will likewise be done.

Figure 16:
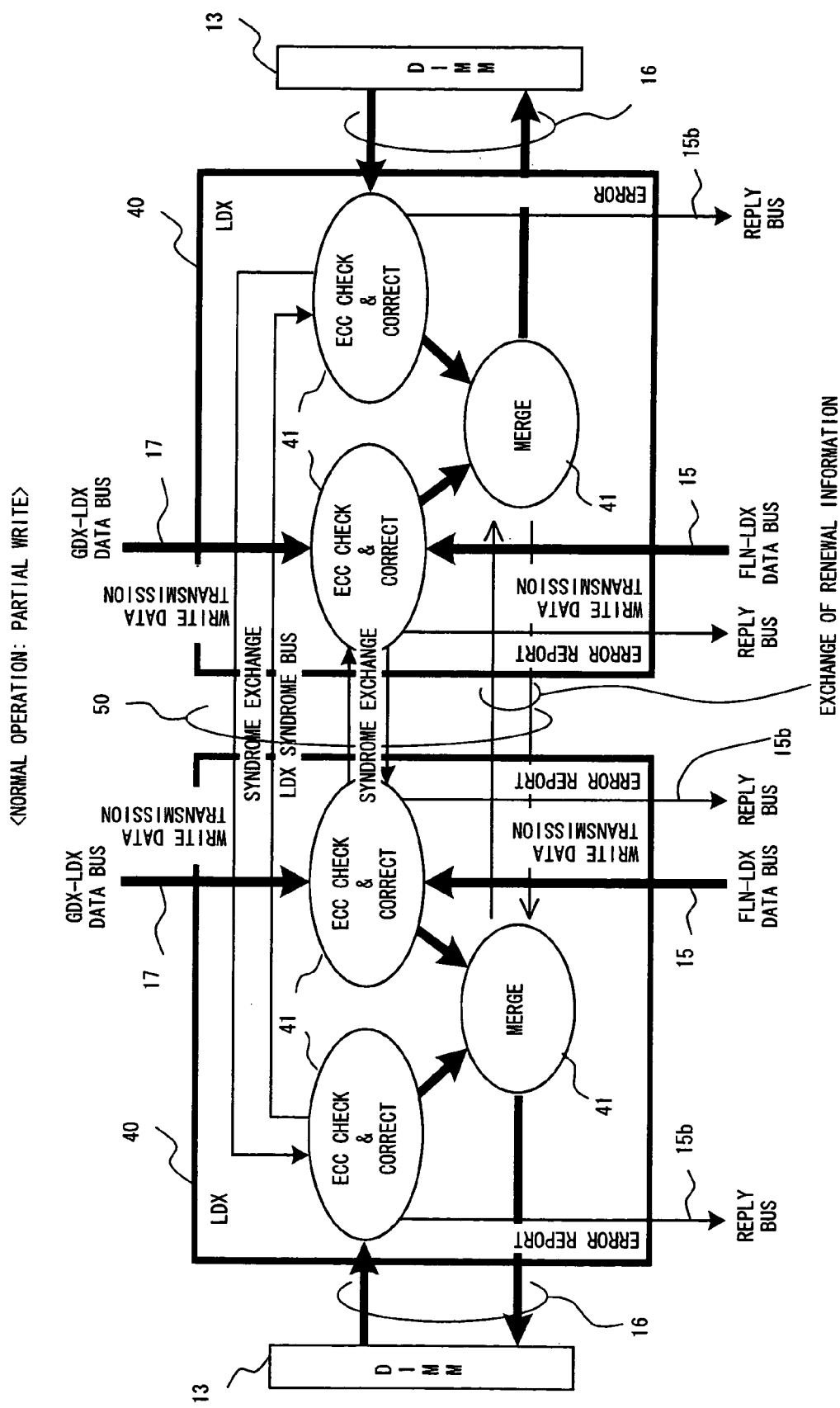
FIG. 16 is a conceptual diagram showing an example of partial write operation by a plurality of data processing apparatuses constituting a memory access control apparatus according to an embodiment of the present invention.

FIG. 16 shows an operation of the LDX in a partial write (i.e., read modify write) for the memory apparatus 13.

Having received a write data from an FLN or GDX, each LDX performs an ECC check and correction by mutually exchanging syndromes, and reports an error to the FLN by way of the reply bus 15b if the error is detected.

Meanwhile, for read data out of DIMM, each LDX also performs an ECC check and correction by mutually exchanging syndromes, and report an error to the FLN by way of the reply bus 15b if the error is detected.

And each LDX mutually exchanges correction results relating to the write and read data as the renewal information by way of the information exchange bus 50.

As for writing data in the DIMM, the LDX merges the write data processed through the ECC check & correction and the read data out of the DIMM by including the ECC check bit to write in the DIMM. If a DBE (double block error) or a Poisoned Data is detected as a result of the ECC check, the Poisoned Data will be written in the DIMM.

As described above, in the read modify write, the present embodiment lets the two LDXes partaking in the ECC check & correction exchange with each other the renewal information for the own apparatuses reflected by the correction result of the read data and that of the write data, in addition to two syndromes relating to the read and write data by way of the information exchange bus 50. The exchange of the renewal information uses the above described renewal information exchange packet 52.

FIG. 17 shows an operation of the LDX in the patrol. After reading data out of the DIMM, each LDX performs an ECC check by exchanging syndromes by way of the information exchange bus 50 and reports an error to the FLN by way of the reply bus 15b if the error is detected.

If an error is detected as a result of the ECC check, the LDX demands a Scrub Write to the FLN to correct the error in the DIMM.

The next description is about a further detail of the above described operation of read modify write while referring to FIG. 1.

First, the two data processing apparatuses 40 (e.g., LDXes #0 and #1) partaking in an ECC check simultaneously receive a write data through the data communication path (i.e., upper side bus 15 or lower side bus 17). Data (A0 through A3) and data (B0 through B3) received at the same timing by an LDX (#0) and LDX (#1), respectively, constitute one ECC unit. The LDX (#0) and LDX (#1) send partial syndromes SD-A0 and SD-B0, respectively, to each other, generate a true syndrome SD-AB0 and perform an error correction. Likewise they further perform an error correction operation. The sequence of write and read operations is not important.

Then, the LDXes #0 and #1 transmit renewal information (i.e., a changed part by the error correction operation) to each other, merge the data and reconstruct a check bit.

Also according to the present embodiment, each LDX can change an operation at an ECC error detection when detecting a specific error pattern by using the above described operation change flag 52c of the renewal information exchange packet 52, which will be described in reference to FIG. 2. The description associated with FIG. 2 is about a pair of LDXes (#0) and (#1).

While the LDXes (#0) and (#1) exchange syndromes with each other by way of the information exchange bus 50, FIG. 2 exemplifies the case of suppressing an error correction operation, if detecting a specific error pattern, by the LDXes exchanging the aforementioned specific error pattern with each other by way of the information exchange bus 50 with a use of the operation change flag 52c of the renewal information exchange packet 52 (FIG. 10). In this case, the renewal information 52d stores the specific error pattern causing the error.

Such control operation performed by the LDX is quite useful in an information processing system adopting the method of identifying an error occurrence point or controlling a program flow by the error marking, that is, by an apparatus which has detected the error, or embedded the error therein, exchanging data in a specific data pattern and constituting an ECC error.

Also, the practice is to enable an error check by adding a synchronism signal to a syndrome data at the discretionary timing by using the synchronism check packet 53 in order to prevent a correct data from an erroneous correction as a result of the LDXes exchanging erroneous syndromes with each other.

As described so far, the present embodiment enables each of a plurality of data processing apparatuses 40 constituting the memory access control apparatus 14 to perform high level processing functions therein, such as a read modify write (i.e., partial write) accompanying a data merge in order to perform an error check by exchanging renewal information, i.e., post-correction data, in addition to exchanging the syndromes.

And, since data by an ECC check unit is processed without folding it by a plurality of data processing apparatuses 40 partaking in the ECC check of data by the ECC check unit, one-bit error can only occur if there is a pin failure, hence enabling an error resistant communication.

Since a plurality of data processing apparatuses 40 partakes in processing data by the ECC check unit, the number of pins for the input and output signals in the data processing apparatus 40 is suppressed, thereby reducing the production cost of the memory access control apparatus 14 including the data processing apparatus 40.

The data processing apparatuses 40 exchange syndromes and the minimum amount of necessary information only, thereby minimizing a bus width between the data processing apparatuses 40.

As a result, if data by the unit of ECC check straddles a plurality of data processing apparatuses 40, an ECC check with an equivalent error detection & correction capability comparable to the case of processing by a single data processing apparatus can be accomplished in an apparatus dealing with data protected by an ECC such as the memory access control apparatus 14 comprising a plurality of data processing apparatuses 40 for example.

In particular, an equivalent error detection & correction capability comparable to the case of processing by a single data processing apparatus can be accomplished for a high level data processing such as a read modify write (i.e., partial data merge).

According to the present invention, each processing apparatus is enabled for a high level data processing so as to require a data merge in an error detection & correction technique for a plurality of the processing apparatuses partaking in processing data by the ECC error check unit.

Also, each processing apparatus is enabled for various kinds of error detection & correction processing in response to the detected error categories in an error detection & correction technique for a plurality of the processing apparatuses partaking in processing data by the ECC error check unit.

Furthermore, an equivalent error detection & correction capability comparable to the case of processing data by the unit of ECC error check by a single data processing apparatus can be accomplished in an error detection & correction technique for a plurality of the processing apparatuses partaking in processing data by the ECC error check unit.

Note that it goes without saying that the present invention is in no way limited by the comprisals exemplified by the above described preferred embodiments, but the present invention can be modified in diverse ways within the scope thereof.

What is claimed is:

1. A control method for an error detection & correction apparatus, the error detection & correction apparatus comprising a plurality of data processing apparatuses which reside in a data communication path and partake in exchanging data by the unit of error correcting code, and a plurality of information exchange paths which are installed between the plurality of data processing apparatuses, the control method comprising:

generating a true syndrome by exchanging a partial syndrome relating to a part of the data partaken by each of the data processing apparatuses by way of the information exchange paths; and exchanging renewal information relating to the part of the data partaken by each of the data processing apparatuses with the other data processing apparatuses by way of the information exchange paths.

2. The control method for an error detection & correction apparatus according to claim 1, further comprising controlling whether or not to exchange said renewal information by way of said information exchange path depending on a pattern category of the renewal information 3. The control method for an error detection & correction apparatus according to claim 1, wherein each of said data processing apparatuses executes a partial write processing for a part of said data partaken by the aforementioned data processing apparatus, followed by executing a renewal of check bit by regarding all the other parts of the aforementioned data partaken by the other data processing apparatus as zero (0), and exchanges the renewed aforementioned check bit with the other data processing apparatus by way of said information exchange path.

4. The control method for an error detection & correction apparatus according to claim 1, further comprising exchanging a specific error pattern detected by each of said data processing apparatuses, by way of said information exchange path.

5. The control method for an error detection & correction apparatus according to claim 1, further comprising protecting information transmitted through said information exchange path by adding an error correcting code to the information exchange path, adding a synchronism confirmation signal to said partial syndrome, and preventing an error of usage timing of the partial syndrome.

6. The control method for an error detection & correction apparatus according to claim 1, further comprising controlling a data length of said partial syndrome.

7. The control method for an error detection & correction apparatus according to claim 1, wherein each of said data processing apparatus sends out said data, as is, to a transmission destination apparatus before executing an error correction for the data by exchanging said partial syndromes and notifies the transmission destination apparatus of error detection information relating to the aforementioned data later on.

8. An error detection & correction apparatus comprising:

a plurality of data processing apparatuses which reside in a data communications path and partake in exchanging data by the unit of error correcting code;

a plurality of information exchange paths which are installed between the plurality of data processing apparatuses;

a generating unit for generating a true syndrome by exchanging a partial syndrome relating to a part of the data partaken by each of the data processing apparatuses by way of the information exchange paths; and an information exchange unit for exchanging renewal information relating to the part of the data partaken by each of the data processing apparatuses with the other data processing apparatuses by way of the information exchange paths.

9. The error detection & correction apparatus according to claim 8, wherein
said information exchange unit controls either exchanging or not exchanging said renewal information by way of said information exchange path depending on a pattern category of the renewal information.

10. The error detection & correction apparatus according to claim 8, wherein
each of said data processing apparatus executes a partial write processing for a part of said data partaken by the aforementioned data processing apparatus, followed by executing a renewal of check bit by regarding all the other part of the aforementioned data partaken by the other data processing apparatus as zero (0), and
said information exchange unit exchanges the renewed aforementioned check bit with the other data processing apparatus by way of said information exchange path.

11. The error detection & correction apparatus according to claim 8, wherein
said information exchange unit exchanges a specific error pattern detected by each of said data processing apparatuses, by way of said information exchange path.

12. The error detection & correction apparatus according to claim 8, wherein
said information exchange unit protects information transmitted through said information exchange path by adding an error correcting code to the information exchange path, adds a synchronism confirmation signal to said partial syndrome, and prevents an error of usage timing of the partial syndrome.

13. The error detection & correction apparatus according to claim 8, wherein
said information exchange unit controls a data length of said partial syndrome.

14. The error detection & correction apparatus according to claim 8, wherein
each of said data processing apparatus sends out said data, as is, to a transmission destination apparatus before executing an error correction for the data by exchanging said partial syndromes and notifies the transmission destination apparatus of error detection information relating to the aforementioned data later on.

15. The error detection & correction apparatus according to claim 8, wherein
the error detection & correction apparatus resides in a data transmission path of an information processing system comprising a storage apparatus, an access apparatus for accessing to the storage apparatus, and the data transmission path for connecting between the storage apparatus and the access apparatus.

16. A computer-readable storage medium storing a control program to perform a control method for an error detection & correction apparatus, the error detection & correction apparatus comprising a plurality of data processing apparatuses which reside in a data communications path and partake in exchanging data by the unit of error correcting code, and plurality of information exchange paths which are installed between the plurality of data processing apparatuses, the control method comprising:
generating a true syndrome by exchanging a partial syndrome relating to a part of the data partaken by each of the data processing apparatuses by way of the information exchange paths; and
exchanging renewal information relating to the part of the data partaken by each of the data processing apparatuses with the other data processing apparatuses by way of the information exchange paths.

17. The computer-readable storage medium storing a control program to perform a control method for an error detection & correction apparatus according to claim 16, wherein the program makes said data processing apparatus further accomplish at least one of the functions of
controlling either exchanging or not exchanging said renewal information by way of said information exchange path depending on a pattern category of the renewal information;
executing a renewal of check bit by regarding all the other part of said data partaken by said other data processing apparatus as zero (0) after each of the data processing apparatuses executes a partial write processing for a part of the data partaken by the aforementioned data processing apparatus, and exchanging the renewed aforementioned check bit with the other data processing apparatus by way of the information exchange path;
exchanging a specific error pattern by each of the data processing apparatuses, by way of the information exchange path; or
protecting information transmitted through said information exchange path by adding an error correcting code to the information exchange path, adding a synchronism confirmation signal to said partial syndrome, and preventing an error of usage timing of the partial syndrome.

* * * * *

UNITED STATES PATENT AND TRADEMARK OFFICE
CERTIFICATE OF CORRECTION

PATENT NO. : 7,543,220 B2  Page 1 of 1
APPLICATION NO. : 11/237765
DATED : June 2, 2009
INVENTOR(S) : Yasufumi Honda et al.

It is certified that error appears in the above-identified patent and that said Letters Patent is hereby corrected as shown below:

Column 12, Line 16, change "information" to --information.--.

Column 14, Line 10, before "plurality" insert --a--.

Column 14, Line 38, before "by" insert --detected--.

Signed and Sealed this

Eighteenth Day of August, 2009

David J. Kappos
*Director of the United States Patent and Trademark Office*